United States Patent [19]

Tsushima et al.

[11] Patent Number: 5,845,024
[45] Date of Patent: Dec. 1, 1998

[54] OPTICAL FIBER WITH LENS AND METHOD OF MANUFACTURING THE SAME

[75] Inventors: Takuji Tsushima; Michitomo Shibutani, both of Tokyo, Japan

[73] Assignee: Namiki Precision Jewel Co., Ltd., Tokyo, Japan

[21] Appl. No.: 809,085
[22] PCT Filed: Sep. 18, 1995
[86] PCT No.: PCT/JP95/01853
§ 371 Date: Mar. 14, 1997
§ 102(e) Date: Mar. 14, 1997
[87] PCT Pub. No.: WO96/08738
PCT Pub. Date: Mar. 21, 1996

[30]     Foreign Application Priority Data

Sep. 16, 1994  [JP]  Japan ................................. 6-248633

[51] Int. Cl.$^6$ ............................................. G02B 6/32
[52] U.S. Cl. .............................. 385/33; 385/43; 65/387
[58] Field of Search ............................. 385/33–38, 43; 65/387

[56]              References Cited

U.S. PATENT DOCUMENTS 3,910,677  10/1975  Becker et al. ......................... 385/33
4,370,021   1/1983  Khoe et al. ............................ 385/33
4,490,020  12/1984  Sakaguchi et al. .................... 385/33

FOREIGN PATENT DOCUMENTS 2 077 943  12/1981  United Kingdom ..................... 385/33

OTHER PUBLICATIONS

Electronic Letters, vol. 17, No. 12, Jun. 11, 1981, H. Sakaguchi et al., "*Power Coupling from Laser Diodes into Single–Mode Fibres with Quadrangular Pyramid–Shaped Hemiellipsoidal Ends*", pp. 425–426.

*Primary Examiner*—Phan T. H. Palmer
*Attorney, Agent, or Firm*—Sixbey, Friedman, Leedom & Ferguson; Gerald J. Ferguson, Jr.; Eric J. Robinson

[57]              ABSTRACT

An optical fiber with lens of a simple construction capable of taking in a flat beam of light efficiently and improving the optical coupling efficiency between an LD and a fiber, and a method of manufacturing the same. Diagonal cut surfaces are provided on both sides of the center of a core at an end of an optical fiber which is opposed to a light source or the outgoing light, whereby a wedge-like end portion is formed, a semicylindrical lens formed to a desired radius of curvature being thus provided at this end of the optical fiber. Portions of a desired radius of curvature which extend in two orthogonal directions are further provided at this end of the optical fiber.

4 Claims, 5 Drawing Sheets

OPTICAL FIBER WITH LENS AND METHOD OF MANUFACTURING THE SAME

FIELD OF TECHNOLOGY

This invention relates to the optical coupling between a luminescent source and an optical fiber used in optical communication.

TECHNOLOGY IN THE BACKGROUND

Laser Diodes (called LD hereafter), Luminescent Diodes, and others are used as a luminescent source for optical communication. However, in order for light to enter into an optical fiber, which is the optical transmission path, coupling is generally performed by aligning the end of an optical fiber with the luminescent surface.

However, due to a considerable divergence in the angle of emission light from the luminescent surface, the coupling efficiency with optical fibers is poor. Consequently, there is a method to improve light entrance into the optical fiber by inserting a lens to improve coupling efficiency and focusing of the light.

In order to obtain optical coupling between an LD and an optical fiber, diverse combinations such as shown in FIG. 5(a)–(d) have been considered in the past. The light emitted from the LD does not form a circular Gaussian distribution but forms an elliptic beam having a large distribution difference in the vertical and horizontal directions.

FIG. 6 is a diagram that depicts the diverging angle of the incident beam from the LD. As seen, the near-end light distribution NFP [near focal point] is elongated along the X-axis, and the far-end light distribution NFP results in an elliptic beam distribution divergent along the Y-axis. Therefore, high coupling efficiency is not obtainable.

The method of coupling shown in FIG. 5(a) was an early concept. It attempts to increase the coupling efficiency by positioning a cylindrical lens 21 between LD 1 and optical fiber 20.

The methods of coupling shown in FIG. 5(c) and (d), both ignore ellipticity and both use a nonspherical lens 22, which take light beam aberrations into account, or in order to ease coupling tolerances during assembly, places two lenses 23 and 24 at the confocal positions.

In this case, the lenses cost more than the optical fiber type, but the merit of realizing equally good coupling is assured. However, since the lenses and fibers are separated in all examples of FIG. 5(a), (c), and (d), alignment of the beam axis becomes that much more difficult; since an interface occurs in the optical path, light will be lost as a consequence. In addition, although an antireflection coat is used, it is not beneficial because there are three surfaces in this case. Furthermore, the fact that there are numerous components raises the overall cost of the system.

On the other hand, in the case of FIG. 5(b) example, a curved surface 25 was formed at the end of the fiber 20 and symmetric to the Z axis, which is the optical axis. Although this alleviated the previously described shortcomings, the beam emitted from LD 1, in spite of its elliptical nature, is coupled to a circular core, which enables axial alignment only in an extremely narrow range and theoretically sets a limitation as well.

In particular, in the case of a distorted Lattice Type Quantum Well Laser, which is anticipated as an LD for optical excitation for light amplification, it becomes necessary to obtain a spacious active layer section in order to increase the inrush current. As a result, the light-emitting window formed on the side ends up in a horizontally extended (about 0~200 μm) shape without a change in the thickness (about 0~2 μm). This is a greater compression compared with the conventional LD, and in order to couple the beams more efficiently, an oblate lens matching the far-end distribution became necessary.

In view of the above-mentioned problems, the purpose of this invention is to offer an optical fiber with lens which, as opposed to the method of assembling special individual lenses, has a simple configuration, is capable of efficiently taking in flat beams, and has an improved optical coupling efficiency between an LD and a fiber.

DISCLOSURE OF THE INVENTION

This invention was made in order to solve the problems in conjunction with the above. The optical fiber with lens based on this invention is equipped with a diagonal section forming a wedge on either side of the center line in reference to the core center of the optical fiber end facing the optical source or emission beam, and forms a semi-cylindrical lens by providing a desired curvature at the tip.

By providing a curvature greater than the radius of the said semi-cylinder in the direction of the semi-cylinder curve at the end of the semi-cylindrical lens, curved facets having different curvatures at the tip and are orthogonal to each other are formed.

In the case of this invention for an optical fiber with a lens, it is structured as described above and is equipped with a fiber lens which enables a simple coupling method. In addition, as it is capable of accepting a flat beam, a high coupling efficiency can be obtained.

In other words, it will be possible to couple beams emitted from a high output LD or LED with a flat emission tip.

In the case of this invention for an optical fiber with a lens, it is structured as described above and equipped with a fiber lens which enables a simple coupling method. In addition, as it is capable of accepting a flat beam, a high coupling efficiency can be obtained, and a flat beam can be used at a low cost. It can present an optical fiber with a lens with an improved coupling efficiency between a semiconductor laser and an optical fiber.

SIMPLE EXPLANATION OF DIAGRAMS

THE BEST FORM EXAMPLE OF THIS INVENTION

Figure 1:
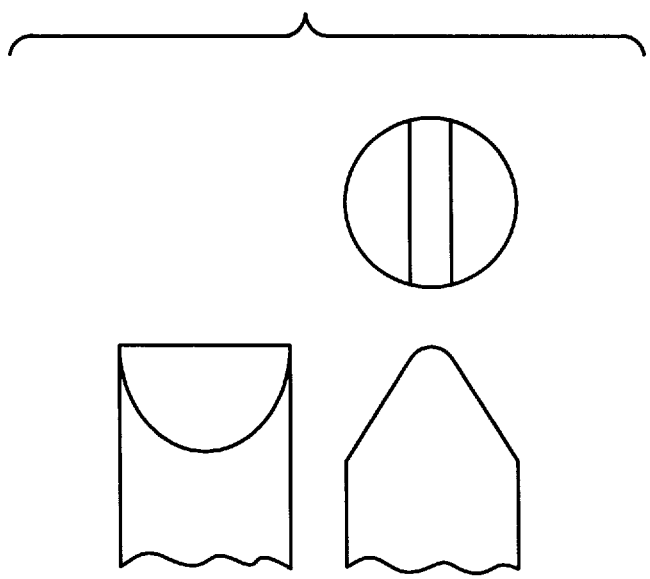
FIG. 1 shows three views of the shape of a fiber with a tapered cylindrical lens which depicts an example of this invention.
Figure 2:
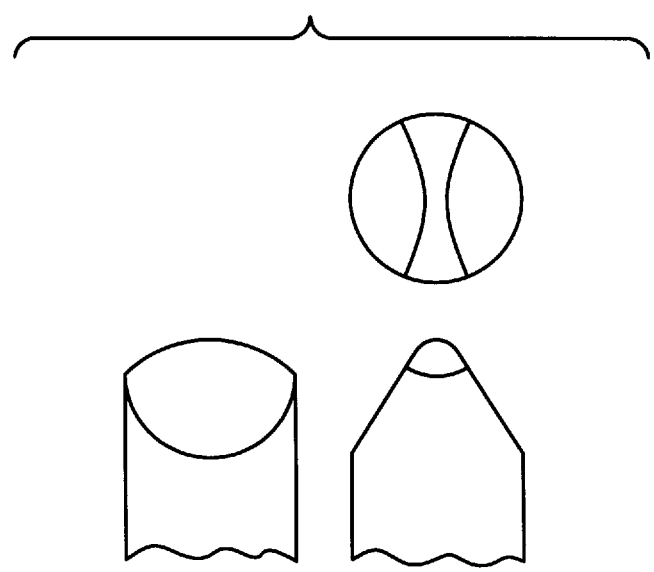
FIG. 2 shows three views of the shape of a fiber with a tapered elliptic lens which depicts another example of this invention.
Figure 3A:
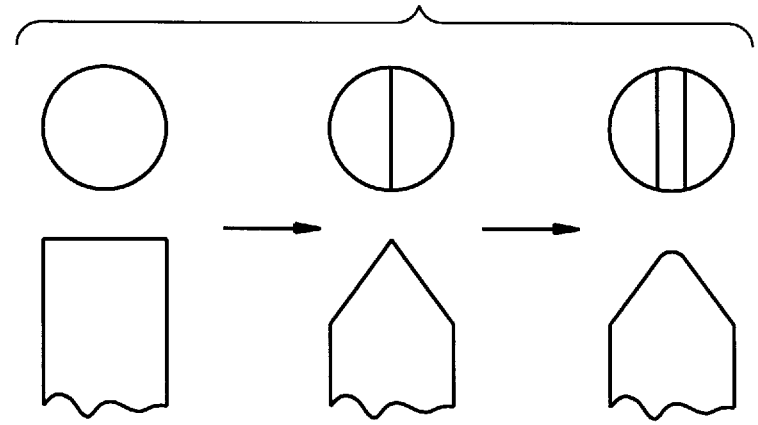
FIGS. 3a–3b are diagrams depicting a manufacturing method of a fiber with a lens as an example of this invention.
Figure 3B:
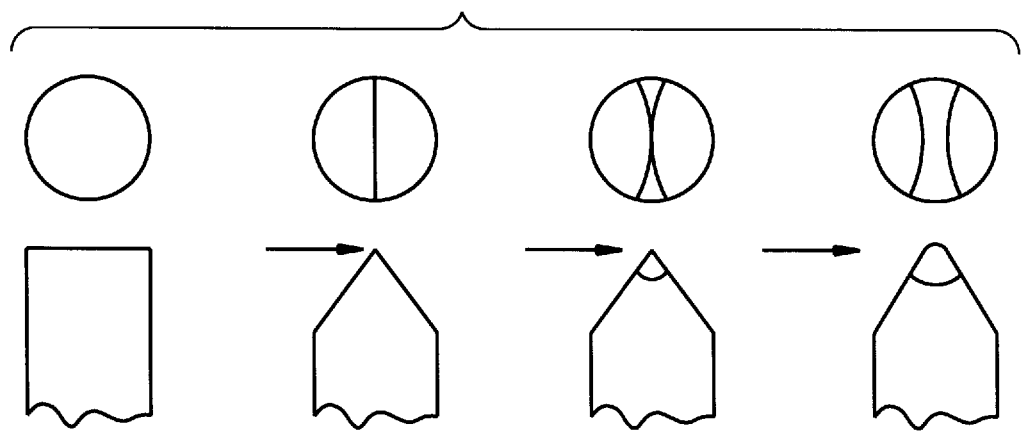
Figure 4A:
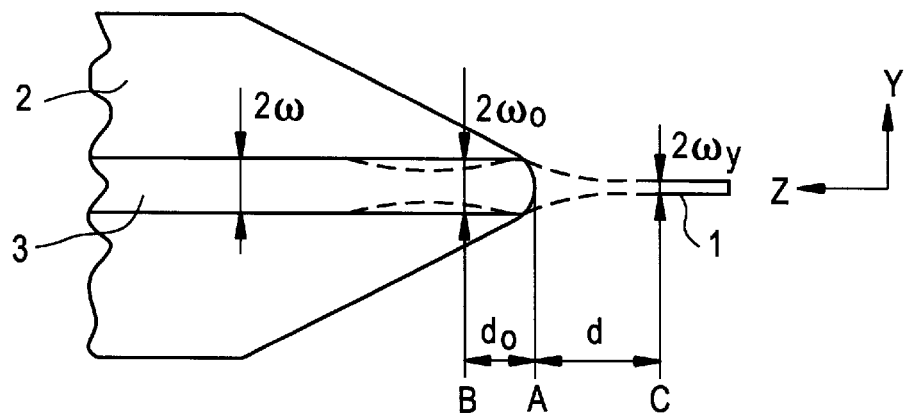
FIGS. 4a–4b are diagrams explaining the formation of a flat beam waist.
Figure 4B:
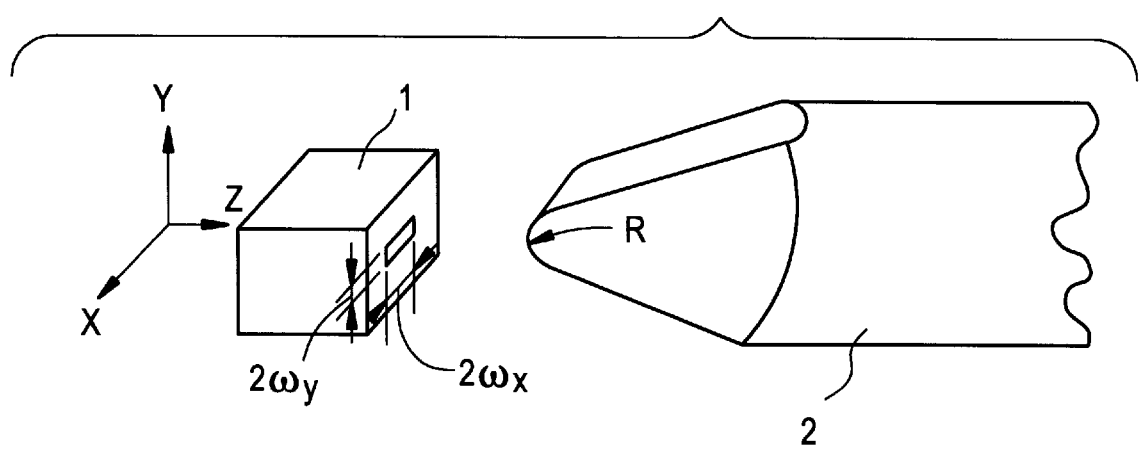
Figure 5A:
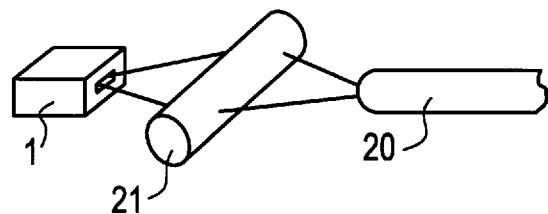
FIGS. 5a–5d are diagrams showing a beam coupling method for a conventional LD and a fiber.
Figure 5B:
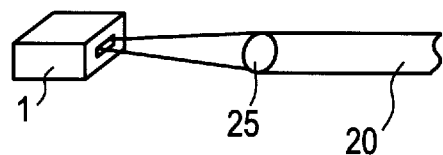
Figure 5C:
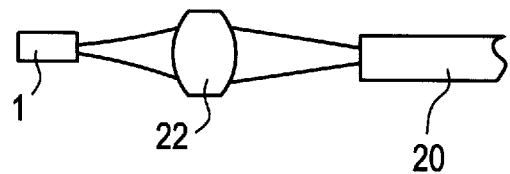
Figure 5D:
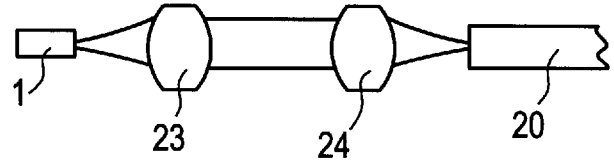
Figure 6:
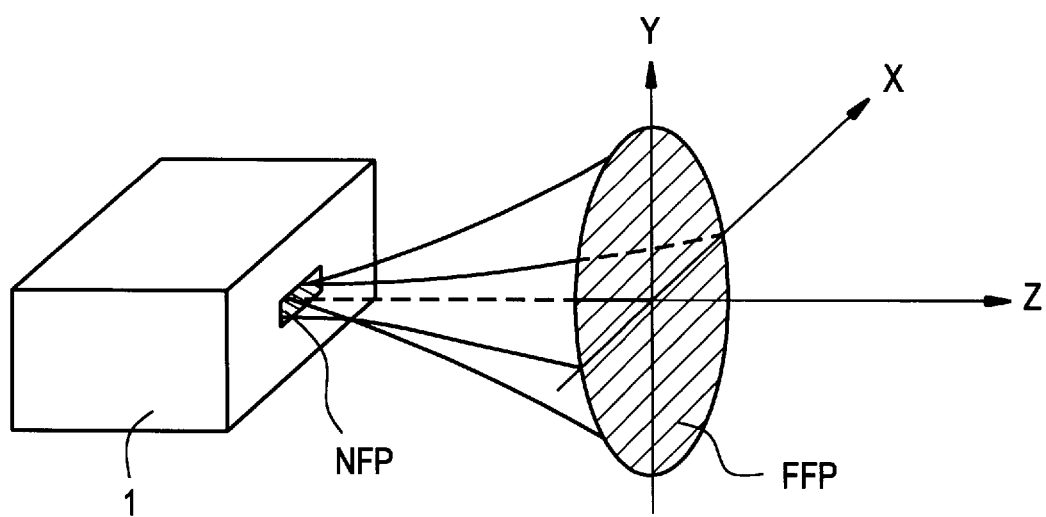
FIG. 6 is a diagram depicting the divergent angle of the emitting beam from an LD.

Examples of this invention are explained below in reference to the diagrams. FIG. 1 shows three views of the shape of a fiber with a tapered cylindrical lens which depicts an example of this invention. FIG. 2 shows three views of the shape of a fiber with a tapered elliptic lens which is another example of this invention. FIG. 3 is a diagram depicting the manufacturing method of a fiber with a lens as an example of this invention. FIG. 4 is a diagram explaining the formation of a flat beam waist.

To form the fiber with a lens based on this invention, the wedge form fiber is made by lapping a fiber from one side as shown in FIG. 3. When the fiber is lapped to the center, it is rotated 180 degrees to lap from the opposite direction. A suitable amount of lapping is used to produce a desired curvature at the tip.

FIGS. 1 and 2 are examples of those shapes. The results in FIG. 1 is a semicylindrical lens, which is suitable for a highly elliptic LD. FIG. 2 is a shape endowed with a focusing effect even for a divergent light in the Y axis direction in FIG. 4.

Next, by referring to FIG. 4, an explanation is given on the principle of efficient entry of the light beam emitted from an LD into the fiber with a tapered cylindrical lens.

The radius of the beam waist in the Y-axis direction at the window C of the LD 1 is denoted as $\omega_Y$, the radius of the beam waist in the X-axis direction is denoted $\omega_X$, and the core radius of the single mode fiber (called SMF hereafter) 2 is denoted as $\omega$.

The distance, $d_0$, from the fiber tip A of the fiber with a tapered cylindrical lens to the beam waist radius, $\omega_0$, inside the fiber with a tapered cylindrical lens is obtained.

In the case of an SMF, the beam enters at a refractive index, NA=0.1. On the other hand, when the refractive index n of the fiber core 3 is n=1.465, and the core diameter is $2\omega=6$ μm; from $$\theta_{(d_0)} = \tan^{-1}\left(\frac{\lambda \cdot d_0}{\pi \cdot \omega_0^2 \cdot n}\right) = 3.914 \text{ degrees} \qquad \text{Equation 1}$$

and $$\omega_y = \omega_0 \sqrt{1 + \left(\frac{\lambda \cdot d_0}{\pi \cdot \omega_0^2 \cdot n}\right)^2} = \omega_0 \sqrt{1 + \tan\theta(d_0)} \qquad \text{Equation 2}$$

$$\omega_0 = \frac{\omega_y}{\sqrt{1 + \tan\theta(d_0)}}$$

Therefore, $\omega_0 = 2.9024$ μm results from Equations 1 and 2. Conversely, $$d_0 = \frac{\tan\theta(d_0) \cdot \pi \cdot \omega_0^2 \cdot n}{\lambda} \qquad \text{Equation 3}$$

For example, assuming that the wavelength of the beam is $\lambda=830$ nm, and substituting n=1.465 into Equation 3, $d_0=3.12$ μm results.

Now, in order to obtain the distance d from the fiber tip A of the fiber with a tapered cylindrical lens to the window C of the LD, the lens curvature is denoted as R; and d is determined by the beam matrix expressed by Equation 4, $$(M_1) = \begin{pmatrix} 1 & d \\ 0 & 1 \end{pmatrix} \begin{pmatrix} 1 & 0 \\ \frac{1-n}{R} & n \end{pmatrix} \begin{pmatrix} 1 & d_0 \\ 0 & 1 \end{pmatrix}$$

In other words, from the general beam matrix equation, $$\left(\frac{\omega_y}{\omega_0}\right)^2 = \frac{1}{\left(\frac{\pi \cdot \omega_0^2}{\lambda}\right)^2 \cdot C^2 \cdot D^2} \qquad \text{Equation 5}$$

whereby $\omega_Y$ can be obtained. For example, when the curvature R=10 μm, $\omega_Y=1.32$ μm results. Conversely, when $\omega_Y$ is known, an optimum curvature R can be obtained.

Similarly, from $$\left(\frac{\omega}{\omega_0}\right)^2 = A^2 + \left(\frac{\lambda}{\pi\omega_0^2}\right)^2 \cdot B \qquad \text{Equation 6}$$

d=15.22 μm is obtained. At this time, since $\omega_X$ has no lens effect, $$\omega_{1x} = \omega_0 \sqrt{1 + \left(\frac{\lambda\left(\frac{d_0}{n} + d\right)}{\pi \cdot \omega_0^2}\right)^2} \qquad \text{Equation 7}$$

is expressed. For example, when $d_0=3.12$ and $\omega_0=2.9024$, $\omega_x=3.4$ μm results.

In other words, the beam emitted from the semicircular lens fiber is able to form a flat beam waist of $\omega_x$=ca. 3.4 μm and $\omega_Y$=ca. 1.3 μm at a position of d=ca. 15 μm from the lens tip A, if the wavelength is $\lambda=830$ nm and the core diameter of the SMF is $2\omega=6$ μm, and when the curvature R=10 μm.

Consequently, when a high output semiconductor laser having a relatively smaller $\omega_Y$ compared to $\omega_X$ is used, a fiber lens compatible to the flattened, irradiating window of $(\omega_Y/\omega_X)$=ca. 1/3~1/5, can be formed, and a high coupling efficiency can be obtained.

The manufacturing processes involve stabilizing the optical fiber and lapping it at 25° to the optical axis to the center of the fiber using an abrasive board. Then, the stabilized fiber is turned upside down 180° and shaped to a wedge form by lapping at 25° to the optical axis as before using an abrasive board. Subsequently, the fiber is lap-finished to a curvature of R=10 μm at the wedged tip by rotating it around the optical axis.

SCOPE OF CLAIMS

We claim:

1. A manufacturing process for an optical fiber with a tapered cylindrical lens characterized by the fact that a wedge form fiber was made by lapping the end surface of the optical fiber from one side of the fiber by mechanical grinding with an tapered angle to the near of the fiber core center and lapping from one side to the core center of the fiber, rotating 180° and grinding from the opposite direction, and lapping to the core center, and lapping the wedge end to give it a semicircular cylindrical shape having the desired radius of curvature.

2. A manufacturing process for an optical fiber with a tapered elliptic lens characterized by the fact that a wedge form fiber was made by lapping the end surface of the optical fiber from one side of the fiber by mechanical grinding with an tapered angle to the near of the fiber core center and lapping from one side to the core center of the fiber, rotating 180° and grinding from the opposite direction, and lapping to the core center, and lapping the wedge end to give it a semicircular cylindrical shape having the desired radius of curvature and further lapping to give a desired curvature in a direction orthogonal to the above.

3. A manufacturing process for an optical fiber with a tapered cylindrical lens characterized by the fact that a wedge form fiber was made by lapping the end surface of the optical fiber from one side of the fiber by grinding and lapping from one side, rotating 180° when lapped to the center of the fiber and grinding from the opposite direction; and then lapping the tip to give it the desired curvature.

4. A manufacturing process for an optical fiber with a tapered elliptic lens characterized by the fact that a wedge form fiber was made by lapping the end surface of the optical fiber from one side of the fiber by grinding and lapping from one side, rotating 180° when lapped to the center of the fiber and grinding from the opposite direction; then lapping the tip to give it a desired curvature and further lapping to give a desired curvature in a direction orthogonal to the above.

* * * * *